(12) United States Patent
Ryckaert

(10) Patent No.: US 7,822,097 B2
(45) Date of Patent: Oct. 26, 2010

(54) DEVICES AND METHODS FOR ULTRA-WIDEBAND COMMUNICATIONS

(75) Inventor: Julien Ryckaert, Tervuren (BE)

(73) Assignee: IMEC, Leuven (BE)

( * ) Notice: Subject to any disclaimer, the term of this patent is extended or adjusted under 35 U.S.C. 154(b) by 1197 days.

(21) Appl. No.: 11/209,103

(22) Filed: Aug. 22, 2005

(65) Prior Publication Data

US 2006/0039448 A1 Feb. 23, 2006

Related U.S. Application Data

(60) Provisional application No. 60/603,128, filed on Aug. 20, 2004.

(30) Foreign Application Priority Data

Feb. 11, 2005 (EP) .................................. 05447023
Apr. 4, 2005 (EP) .................................. 05447075

(51) Int. Cl.
*H04B 1/00* (2006.01)

(52) U.S. Cl. .................. 375/130; 375/135; 375/136; 375/146; 375/147; 375/219; 375/295; 375/316

(58) Field of Classification Search .................. 375/130, 375/132–137, 146–147, 150, 242, 259–260, 375/295, 306, 316, 239; 370/213
See application file for complete search history.

(56) References Cited

U.S. PATENT DOCUMENTS 4,500,844 A * 2/1985 Lisco .......................... 379/418

5,677,927 A 10/1997 Fullerton et al.
(Continued)

FOREIGN PATENT DOCUMENTS

JP 05135567 * 6/1993 ................. 327/299
(Continued)

OTHER PUBLICATIONS

Frenzel "Crash Course in Electronics Techology", pp. 241-242, second edition, Published by Newnes, Dec. 1997 ISBN 0750697105, 9780750697101.*
(Continued)

*Primary Examiner*—Mohammad H Ghayour
*Assistant Examiner*—Sophia Vlahos
(74) *Attorney, Agent, or Firm*—McDonnell Boehnen Hulbert & Berghoff LLP

(57) ABSTRACT

A method for generating an ultra-wideband communications signal is described. The method includes generating a piecewise linear ultra-wideband baseband signal comprising at least one pulse, based on an inputted data signal; generating a carrier tone having a carrier frequency suitable for wireless transmission; and upconverting the baseband signal with the carrier tone to the carrier frequency. A method for interpreting a received ultra-wideband communications signal, the signal having a center frequency in the RF domain, is also described. The method includes generating at least one local signal template, synchronized with the received ultra-wideband communications signal and having substantially the same center frequency; correlating the received ultra-wideband communications signal with each of the local signal templates in the analog domain, obtaining at least one ultra-wideband baseband signal; and interpreting the at least one ultra-wideband baseband signal to generate a data signal. Devices for implementing these methods are also described.

34 Claims, 9 Drawing Sheets

U.S. PATENT DOCUMENTS

| | | | |
|---|---|---|---|
| 5,802,452 A * | 9/1998 | Grandfield et al. | 455/20 |
| 6,055,168 A * | 4/2000 | Kotowski et al. | 363/60 |
| 6,970,496 B1 * | 11/2005 | Ben-Bassat et al. | 375/141 |
| 6,980,613 B2 * | 12/2005 | Krivokapic | 375/346 |
| 7,099,368 B2 * | 8/2006 | Santhoff et al. | 375/130 |
| 7,164,720 B2 * | 1/2007 | Molisch et al. | 375/256 |
| 7,330,521 B2 * | 2/2008 | Iizuka | 375/343 |
| 2002/0039078 A1 | 4/2002 | Low et al. | 341/157 |
| 2002/0061081 A1 * | 5/2002 | Richards et al. | 375/346 |
| 2003/0128783 A1 | 7/2003 | Richards et al. | 375/355 |
| 2003/0161411 A1 * | 8/2003 | McCorkle et al. | 375/295 |
| 2004/0136438 A1 * | 7/2004 | Fullerton et al. | 375/130 |
| 2004/0151109 A1 * | 8/2004 | Batra et al. | 370/208 |
| 2004/0156446 A1 * | 8/2004 | Santhoff et al. | 375/295 |
| 2005/0105595 A1 * | 5/2005 | Martin et al. | 375/140 |
| 2005/0134393 A1 * | 6/2005 | Kim et al. | 331/36 C |
| 2005/0141602 A1 * | 6/2005 | Hyun et al. | 375/219 |

FOREIGN PATENT DOCUMENTS

WO    WO 01/97396 A2    12/2001

OTHER PUBLICATIONS

International Search Report for EP05107696 Dated Nov. 25, 2005.
International Search Report for EP 05447075 dated May 3, 2005.
Zhuang et al., "Ultra-Wideband Wireless Communications," Wireless Communications and Mobile Computing, 2003, 3:663-685, Sep. 2003.
Win et al., "Ultra-Wide Bandwidth Time-Hopping Spread-Spectrum Impulse Radio for Wireless Multiple-Access Communications," IEEE Transactions on Communications. vol. 48, No. 4, Apr. 2000.
Boryssenko et al., "Efficient and Practical Pulses for Dipole Antenna UWB Link," IEEE, Aug. 2004.
Kasamatsu et al, "Overview of Experimental Device Implementation in CRL UWB R&D Consortium," IEEE, Jul. 2004.

* cited by examiner

DEVICES AND METHODS FOR ULTRA-WIDEBAND COMMUNICATIONS

RELATED APPLICATIONS

The present patent application claims priority under 35 U.S.C. §119(e) to U.S. Provisional Patent Application Ser. No. 60/603,128, which was filed Aug. 20, 2004. The present patent application also claims priority under 35 U.S.C. §119(b) to European Patent Application No. EP 05447023.2 filed on Feb. 11, 2005, and European Patent Application No. EP 05447075.2 filed on Apr. 4, 2005. The full disclosures of U.S. Provisional Patent Application Ser. No. 60/603,128, European Patent Application No. EP 05447023.2, and European Patent Application No. EP 05447075.2 are incorporated herein by reference.

FIELD

The present invention relates generally to Ultra-Wideband (UWB) communications, and more particularly, relates to impulse-based UWB systems (also called IR-UWB for Impulse Radio).

BACKGROUND

Traditional approaches generally use specialized circuits to generate UWB pulses. Traditional IR-UWB systems generally rely on specific components, such as step-recovery diodes or external inductor coils. A current discharge through these components generates a pulse in the Radio Frequency (RF) domain. The pulse is sent through the air after some filtering from the antenna or other components inserted in the chain.

This traditional approach has the disadvantage that only a fixed type of pulse can be generated. Therefore, it would be beneficial to provide a method for generating an UWB communications signal that is more flexible.

SUMMARY

A system and method for UWB communications is described. The system and method combine baseband signal processing and up-/down-conversion in the field of UWB communications. On a transmitter side, a piecewise linear ultra-wideband baseband signal is generated, which is then upconverted to the RF domain by mixing with a carrier tone of the desired RF frequency. The piecewise linear ultra-wideband baseband signal is a signal that includes at least one pulse.

The term "piecewise linear" means that a graph of the signal is a sequence of substantially linear parts. An alternative definition is that the first derivative of the graph of the signal is non-smooth.

The term "ultra-wideband signal" means, according to FCC regulations, a signal having a bandwidth of at least 20% of the center frequency or at least 500 MHz, and a center frequency between 3 and 10 GHz. The 5-6 GHz band may be excluded in practice, since this band is used up by WLAN communication.

By splitting the baseband signal from the RF domain, more flexibility can be achieved in the system. The shape of the pulse, thereby its bandwidth, and the central frequency around which the pulse will be placed in the spectrum can be separately adapted from each other. These parameters can be tuned separately in the final circuit. This is not true for traditional IR-UWB systems, which can only produce a fixed type of pulse. For example, a pulser can be made that allows separate tuning of bandwidth from 500 MHz to 2 GHz, and central frequency from 3 GHz to 5 GHz.

In a method for generating an ultra-wideband communications signal, according to an example, the carrier tone is preferably generated by means of an oscillator that is switched off between two pulses. In this way, power consumption may be minimized. The oscillator is preferably a ring oscillator due to the ring oscillator's fast start-up characteristics.

The pulse or envelope that is used for the baseband signal is preferably triangular because a triangular form is easy to generate. However, all other piecewise linear pulse forms known to a person skilled in the art, such as rectangular or trapezoidal forms, may also be used.

A pulser (i.e., a central part of the transmitter) includes an oscillator that generates the carrier tone of the desired center frequency, a signal generator for generating the piecewise linear ultra-wideband baseband signal (herein also called baseband envelope), and a mixer for upconverting the baseband signal to the RF domain by means of the carrier tone.

The signal generator may include a pulse position modulator for pulse position modulation. A pulse shaping circuit may be used to tune the shape of the pulse. In order to reduce the power consumption of the circuit in very low-duty-cycle IR-UWB (more time is spent between pulses than during pulses), a fast start-up ring oscillator is used. The ring oscillator is started and stopped for each pulse, using a special biasing to speed-up its starting phase. The oscillator output is then mixed with the envelope (the baseband signal with discrete pulses) for upconversion to the RF domain.

Other modulation techniques known in the art may also be employed, such as differential binary phase-shift keying (BPSK) modulation. By creating an imbalance inside the ring oscillator circuit, the start-up of the ring oscillator is enforced with an initial condition. If the imbalance is inverted, the ring oscillator may start-up in the opposite phase. Differential phase modulation (e.g., BPSK) may then be performed by choosing the sign of the imbalance depending on the inputted data signal.

Moreover, the pulser can be more easily integrated than standard technology. Specific external or exotic components are not required, so that the pulser can be integrated into standard digital CMOS without external components.

On receiver side, a received UWB communications signal in the RF domain is interpreted as follows for retrieving the original data signal. A plurality of local signal templates is generated in synchronization with and having substantially the same center frequency as the received signal. The received UWB communications signal is then correlated with the templates, which are phase-shifted with respect to each other, in the analog domain, and the data signal is retrieved by sampling the output of the correlators. The correlation in the analog domain has the advantage that digital operations for retrieving the data signal are relaxed due to the lower speed of operation.

Furthermore, a more simple synchronization on the envelope can be achieved, which is sufficient for non-coherent orthogonal pulse position modulations, while other systems have to synchronize on the full RF pulse. The required accuracy is largely reduced in this example, which can make a big difference as synchronization is known to be a bottle-neck in UWB systems.

The correlation preferably comprises the mixing of both signals and the integration of the mixed signal. However, other correlation techniques known to the person skilled in the art may also be used.

The signal templates are preferably generated by switching a ring oscillator on and off, in synchronization with the received UWB telecommunications signal. This has the advantage of being easy to implement, while energy loss as a result of a possible synchronization error is kept at a minimum. The signal templates may also be implemented in other ways, such as in a similar way as the pulse generation on the transmitter side in a case in which a strong correlation overlap is desired.

In one example, two phase-shifted local signal templates are generated in which the phase shift between the two signal templates is maintained at substantially 90°. This leads to a correlation in quadrature, which relaxes the timing constraints on the local signal templates. In another example, three branches are used, which enables the correlation by means of three signal templates with 120° phase offset between them. This is similar to the quadrature correlation. Furthermore, the interpretation can be based on any number of branches with any phase shift between the local signal templates.

In the above described examples, the detection can be based on non-coherent envelope detection if an orthogonal modulation, such as pulse position modulation (PPM), is used, combining the energy of the two/three branches, or coherent detection if BPSK modulation is used, coherently recombining the two/three phases. This choice is not as easy for traditional (non carrier-based) IR-UWB systems. For these traditional IR-UWB systems, the best option is to convert everything to the digital domain where the processing takes place. However, this leads to higher power consumption due to high-speed ADCs and heavy digital processing.

Based on the above described concept of interpretation of a received UWB communications signal, a suitable receiver includes a signal generator for generating the plurality of signal template, a timing circuit acting on the signal generator for synchronization, a plurality of analog correlators (one per template) for correlating the UWB communications signal with the signal templates, and (digital) interpretation means (e.g., a baseband detection circuit) for finally deriving a data signal. The receiver may also include other components.

Like the pulser on transmitter side, the "interpreter" on receiver side can also be implemented in CMOS.

Each of the analog correlators preferably includes a mixer and an analog integrator downstream of the mixer. The mixer receives as inputs the received UWB communications signal and one of the signal templates. The signal generator preferably includes a ring oscillator, which is switched on and off by the timing circuit. In the case of a quadrature correlation, the receiver preferably includes two analog correlators and a phase shifter, which generates a second signal template by phase-shifting a first signal template over substantially 90°. In the case of a three-branch correlation, the receiver preferably comprises three analog correlators and phase shifting means for maintaining the phase shift between three signal templates at approximately 120°. As mentioned above, a different number of branches and different phase shifts between the signal templates are also possible.

Precise timing generation that is re-usable in the various parts of an UWB transmitter and an UWB receiver is beneficial. Furthermore, it is desirable that the timing generation solution be suited for CMOS implementation and does not consume too much power. The precise timing generation may be realized by an arrangement of a current source, a first capacitor, and a comparator.

In an example, a pulse position modulating circuit is provided that uses the precise timing generation mechanism, by providing a second capacitor, switchable with the first capacitor, in accordance with the input data of the pulse position modulating circuit.

In an example, a pulse shaping circuit is provided that uses the precise timing generation mechanism, by providing means to charge and discharge the first capacitor by feeding back an output of the comparator.

In an example, an oscillator activation circuit is provided, which is based on essentially the same principle as the pulse position modulating circuit. In a device in which both the pulse shaping circuit and the oscillator activation circuit are present, a fixed relationship between the current sources of the circuits is set.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

The UWB technology is a potential solution for an ultra-low power implementation for wireless communication. Indeed, the heavy duty cycle nature of the signals allows most of the system to be turned off between the UWB pulses. The energy consumption is calculated by referring to the transmission of a single pulse. Since several pulses are required to transmit one bit of information, the energy per bit is given by the number of pulses (Nppb) required for one bit times the energy per pulse (Epp). This last quantity is important specification for a UWB pulser, the former being more related to the link budget calculations.

As an example, if one hundred pulses are required to transmit one bit of information, and the targeted energy per bit is 10 nJ per bit, the targeted energy consumption per pulse is then 100 pJ per pulse. Of course, between the pulses, there is also some energy consumption (i.e., standby power, Pstby) that needs to be taken into account in the final calculation.

Some other parameters are related to the signal itself. The instantaneous power, directly related to the amplitude (Ap) of the pulse, is defined as the output power (Pout). Pout is defined as follows:

$$P_{out}[dBm] = 10 \log\left(\frac{A_p^2}{2.50} \cdot \frac{1}{1\,mW}\right).$$

Pout is used in the link budget calculation.

Figure 1:
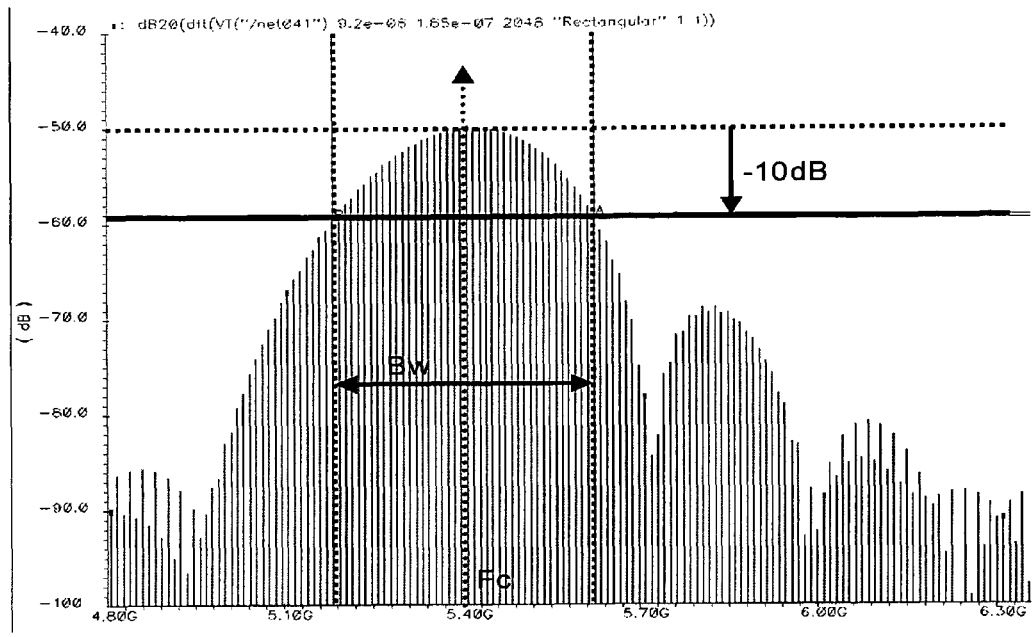
FIG. 1 is a graph depicting spectrum specification definitions.

Another parameter is the bandwidth (Bw) of the pulses. This quantity is defined by the −10 dB points referred to the maximum point in the spectrum of the signal. The maximum point in the spectrum is shown in FIG. 1.

The system is based on modulated pulses. The bandwidth of the pulses is centered around a carrier frequency (Fc), which is defined as the middle point of the bandwidth. Note that this carrier frequency is usually different than the maximum frequency inside this bandwidth.

Figure 2:
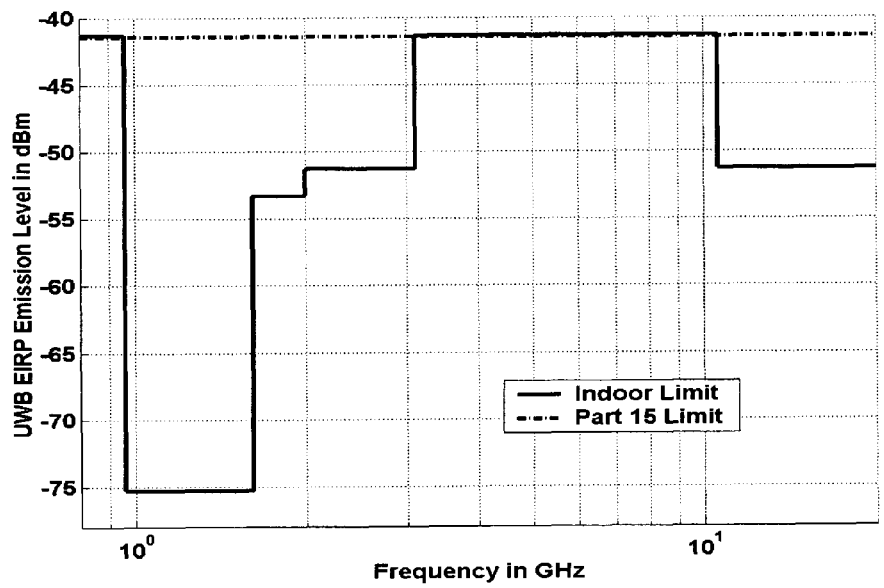
FIG. 2 is a graph depicting spectrum requirements of UWB devices due to regulations.

The FCC regulation in the United States requires UWB communication to operate under precise conditions. Other regulatory bodies in the world are still evaluating the impact of UWB systems on other existing communication systems. According to the FCC, a UWB signal is defined as a signal for which its −10 dB bandwidth is higher or equal to 20% of its center frequency, or a signal for which its −10 dB bandwidth is higher or equal to 500 MHz. Since the UWB power should not harm other existing communication systems, a maximum average power spectral density is defined as −41 dBm/MHz. To avoid interference with the low power signals of GPS systems, a lower spectral density is defined for a signal below 3.1 GHz. The spectrum mask is given in FIG. 2.

However, UWB operation between 3.1 GHz and 10.6 GHz results in an overlap with the IEEE 802.11a WLAN standard, which operates in the ISM band between 5 GHz and 6 GHz. In order to prevent interference with the IEEE 802.11a WLAN standard, operation between 5 GHz and 6 GHz is avoided. If 0.18 um CMOS technology is used, it may be difficult to operate at low power consumption between 6 GHz and 10 GHz. As a result, the UWB system is preferably designed to operate between 3.1 GHz and 5 GHz.

The pulse rate is a power consumption compromise between pulse duty cycling and clock generation power. High clock rates allow a lower output power, thus lower power consumption, but higher clock power consumption. Lower clock rates result in higher output power, but lower clock consumption. First estimates of the optimum pulse rates result in a clock rate around a few tens of MHz. The optimum pulse rate is preferably around a few tens of MHz. The pulse rate is preferably tunable around a predetermined value. The pulse repetition time is the inverse of the clock rate (=pulse rate). A typical value of the pulse repetition time is in the order of 100 ns.

A periodic signal gives rise to spikes in the spectrum, which may result in an infringement of the FCC rule. Randomization in the repetition of the pulses can be implemented to smooth these spikes. Pulse position modulation is the most efficient means to smooth the spectrum. Since pulse position modulation implementation is not too complex, this modulation approach is preferably chosen.

The pulse position (Tpos) relative to a precise clocking instant defines the value of the data information. The specification for this value results from the detection method used in the receiver. For the detection to be optimal, position of the pulses should not overlap. The longest pulse duration occurs for the 500 MHz bandwidth, which is in the order of 2-4 ns depending on the pulse shape. Twice this value will then guaranty non-overlapping symbols. A maximum for the pulse position modulation time is given by half the repetition time (Trep/2~50 ns) in order to distinguish a symbol from the next one.

The output power required is related to the pulse repetition rate. Indeed, since the FCC regulation restricts the average output power, increasing the pulse rate results in a lower pulse output power. The calculations of output power result from link budget analysis. These have been roughly done resulting in a required output power of around 0 dBm.

For UWB communication, the standby power is an important parameter to reduce as much as possible. The standby power for typical low power communication systems for similar applications is around 10 nJ/bit. A standby power target of 1 nJ/bit seems possible with UWB, which demonstrates the low power capabilities of UWB.

In summary, the preferred pulser specifications are given in the following table:

| Parameter | | Specification |
|---|---|---|
| Frequency range | Fc | 3 GHz-5 GHz |
| Bandwidth | Bw | 500 MHz-2 GHz |
| Pulse repetition time | Trep | >50 ns |
| Modulation type | | Pulse position |
| PPM timing position | Tpos | 4 ns-25 ns |
| Output power | Pout | 0 dBm |
| Energy consumption per pulse | Epp | 10 pJ |
| Standby power | Pstby | <<< |

Figure 3:
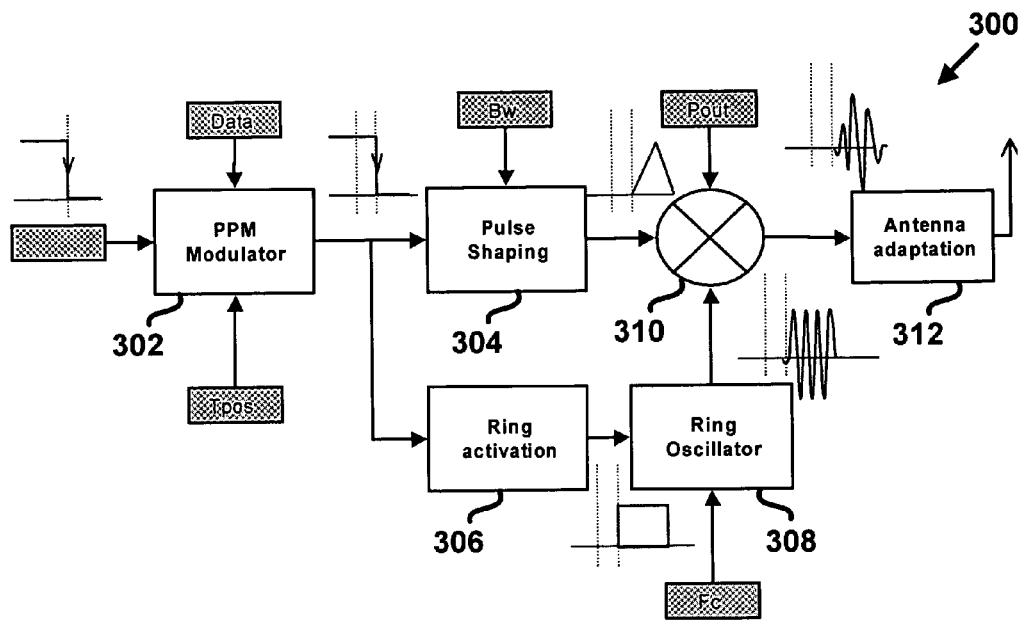
FIG. 3 is a block diagram of a UWB transmitter architecture, according to an example.

The system is thus designed for transferring digital data into position-modulated pulses with a tunable bandwidth of at least 500 MHz centered on a carrier between 3 GHz and 5 GHz. A block diagram of a UWB transmitter 300 is depicted in FIG. 3.

The UWB transmitter 300 is subdivided into five basic functions, including a pulse position modulator 302, a pulse shaping circuit 304, a ring activation circuit 306, a ring oscillator 308, and an antenna adaptation circuit 312. The pulse position modulator 302 enables the pulse shaping circuit 304 and the ring activation circuit 306 at a variable time instant with respect to a clock. The pulse shaping block 304 creates an envelope for a pulse. In this example, the pulse is a triangle with a tunable duration.

The ring activation circuit 306 creates a ring activation signal. The ring activation signal activates (i.e., turns on and off) a ring oscillator 308. A center frequency of the ring oscillator 308 is tunable. A ring oscillator 308 is used for its fast start-up time and because phase noise is not an important requirement in the UWB transmitter 300.

An oscillating signal from the ring oscillator 308 and the triangular pulse from the pulse shaping circuit 304 are both fed into a mixer 310. The mixer 310 provides an upconversion of the triangle shape to the center frequency defined by the ring oscillator 308. The antenna adaptation circuit 312 provides an interface with the antenna. Requirements for the antenna adaptation circuit 312 include differential to single-ended conversion, impedance adaptation, and filtering.

Figure 4:
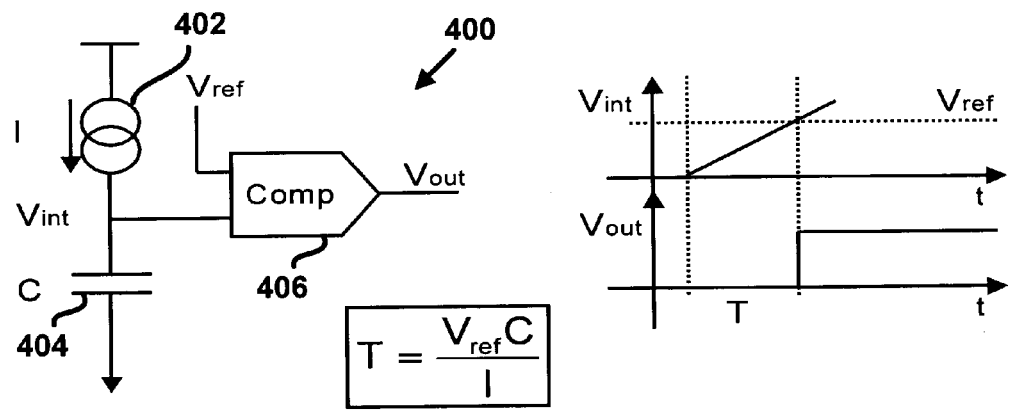
FIG. 4 is a circuit diagram of a timing generation circuit, according to an example.

As described below, three of the components of the UWB transmitter 300 are based on timing generation. The idea is to generate timing by integrating charges into a defined capacitor and comparing the resulting voltage over the capacitor to a reference voltage. A timing generation circuit 400 is shown in FIG. 4. The timing generation circuit includes an integrator 402, a capacitor 404, and a comparator 406.

Figure 5:
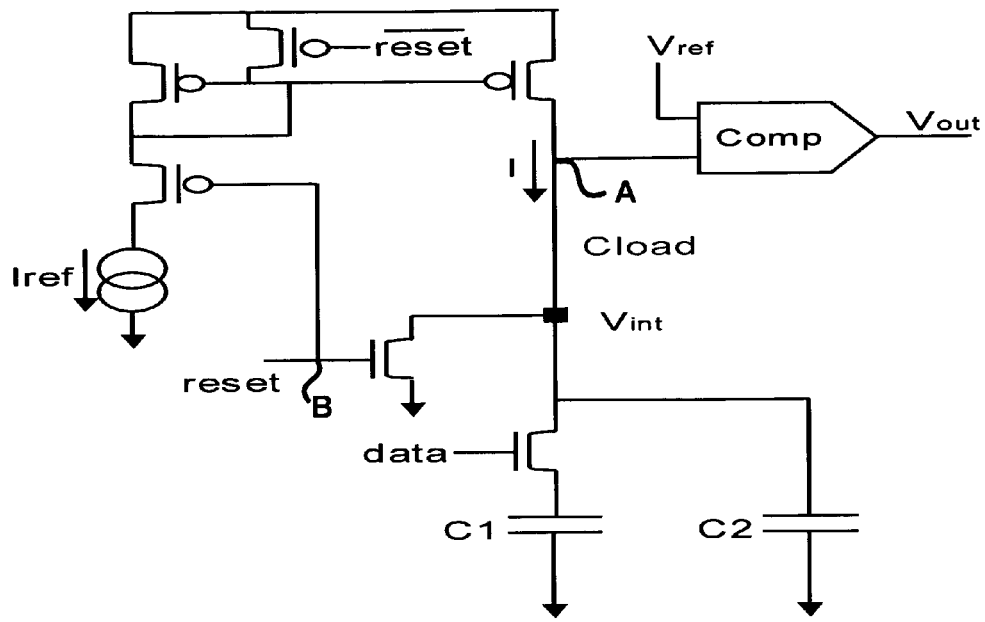
FIG. 5 is a circuit diagram of a pulse position modulator, according to an example.

The pulse position modulator 302 uses the timing generation circuit 400. Based on the charge integrator described above, two different timings can be generated by switching between two capacitor values using a data signal. A precise timing difference can be defined by tuning the capacitor value and the current. FIG. 5 depicts an example circuit diagram of the pulse position modulator 302.

The time difference between two pulse positions will be given by the difference in load capacitance (Cload) at the integration node A. That is:

$$\Delta T = T_2 - T_1$$
$$= \frac{V_{ref}(C_{par} + C_1 + C_2)}{I} - \frac{V_{ref}(C_{par} + C_2)}{I}$$
$$\Rightarrow \Delta T = \frac{V_{ref}}{I}(C_{par} + C_1)$$

In this design, C1 and the parasitic capacitance of the transistors (Cpar) are fixed in the design, so tuning the reference current (Iref) can modify the time difference. Typical values for this design are:

| Vref = | 1 V |
| Cpar = | 200 fF |
| C1 = | 300 fF |
| (C2 = | 120 fF) |

For example, in order to obtain a time difference of 10 ns a current of 50 uA is required.

Figure 6:
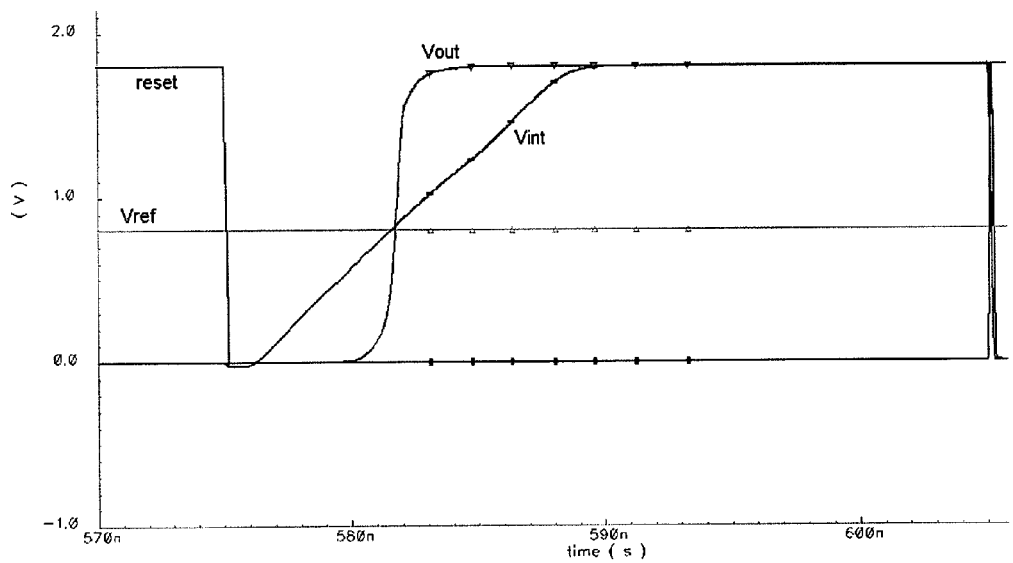
FIG. 6 is a graph depicting simulation results of the operation of the pulse position modulator depicted in FIG. 5.

The reset node B serves to bring the integration node A back to zero. Once the reset signal is set to zero (falling edge), the integration node A starts to rise, and once the integration node A reaches the reference voltage (Vref), the integration node A generates the output-enabling signal. The integration node A continues to charge and shuts the Pmos current source off, avoiding extra current consumption. Then, at the rising edge of the reset signal, the Nmos transistor shorts the integration node A to ground, and the integration node A is ready for a next integration. However, an extra Pmos transistor, controlled by the complementary reset signal, shuts the current source off. This is essential since the current source is directly connected to ground at that instant. The next falling edge instant releases the integration node A and switches the current source back on for the next integration to occur. The essential voltages are shown in FIG. 6.

Figure 7:
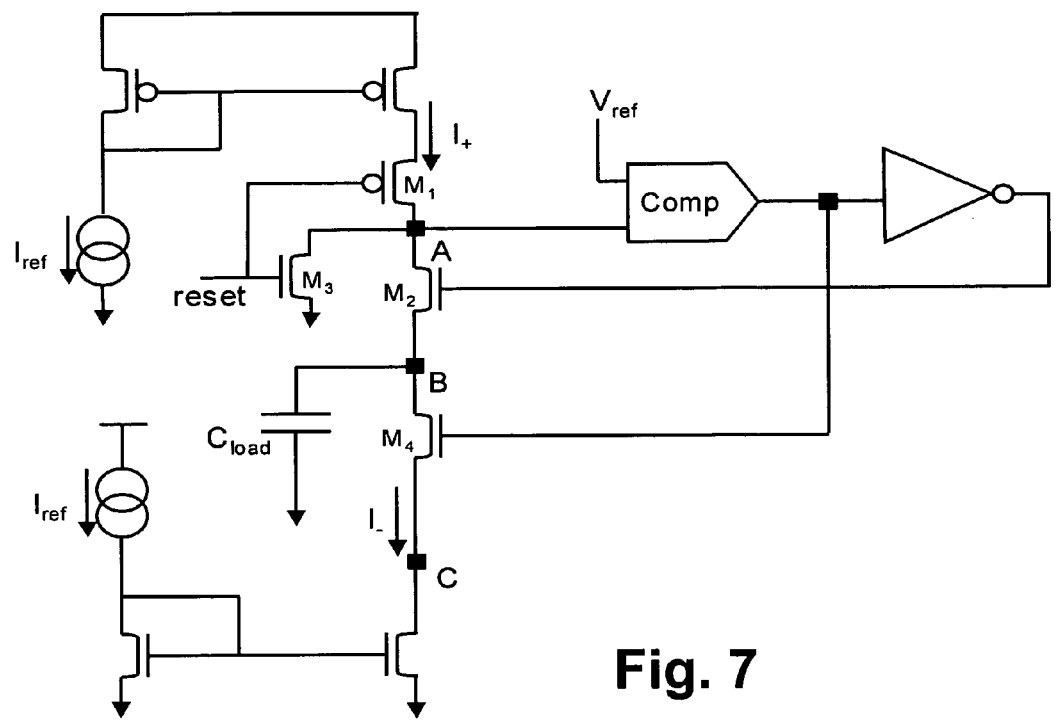
FIG. 7 is a circuit diagram of a pulse shaping circuit, according to an example.

The pulse shaping circuit 304 also uses the timing generation circuit 400. It is important to shape the pulse in order to avoid out of band emissions. Indeed, if square-wave pulses are used, the harmonics of the square envelope give rise to unwanted lobes next to the spectrum of the signal. These lobes can be attenuated or even suppressed by applying a smooth envelope to the pulse. The integration method described above is used to apply the smooth envelope to the pulse. This integration method does not require extra special components, like step recovery diodes and does not consume much energy. The idea is to create triangle shapes by charging and discharging a capacitor. The shape can then easily be modified by playing with the charging current, the capacitor load, or the reference voltage in the comparator. FIG. 7 depicts an example circuit diagram of the pulse shaping circuit 304.

Figure 8:
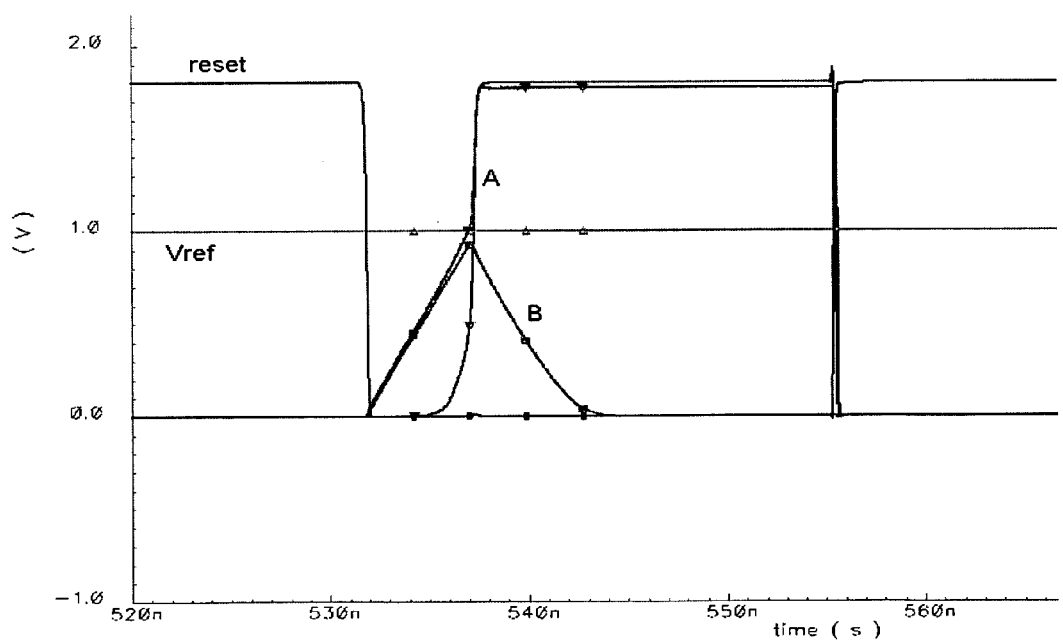
FIG. 8 is a graph depicting simulation results of the operation of the pulse shaping circuit depicted in FIG. 7.

The falling edge of the reset signal lets the I+ current flow into the load capacitor (Cload) by opening transistor M1 and closing transistor M3. Once the voltage at node A reaches the reference voltage (Vref), the comparator opens transistor M4 and the same but inverted signal closes transistor M2. The load capacitor is connected to the Nmos current source and the load capacitor is discharged via the I− current. The voltage at node B results from this charging/discharging process producing a triangular signal. Similar to the pulse position modulator 302, the next rising edge of the reset signal brings the voltage back to the initial state. The essential signals are shown in FIG. 8.

In order to vary the pulse duration, which has the effect of varying the bandwidth of the signal, a switch capacitor array may be used as Cload. A configuration signal fixes the capacitor value of Cload. For instance, a three-bit configuration signal can be used, fixing the capacitor value between 200 fF and 550 fF (including the 150 fF parasitic capacitance) by steps of 50 fF. The duration of the triangle can be further tuned by adjusting the reference current (Iref). MOS capacitors may be used due to their compatibility with standard logic processes. Since the voltage across the resistor ranges between 0 and 1V, Pmos transistors are used to keep the capacitor value constant in this voltage range.

Figure 9:
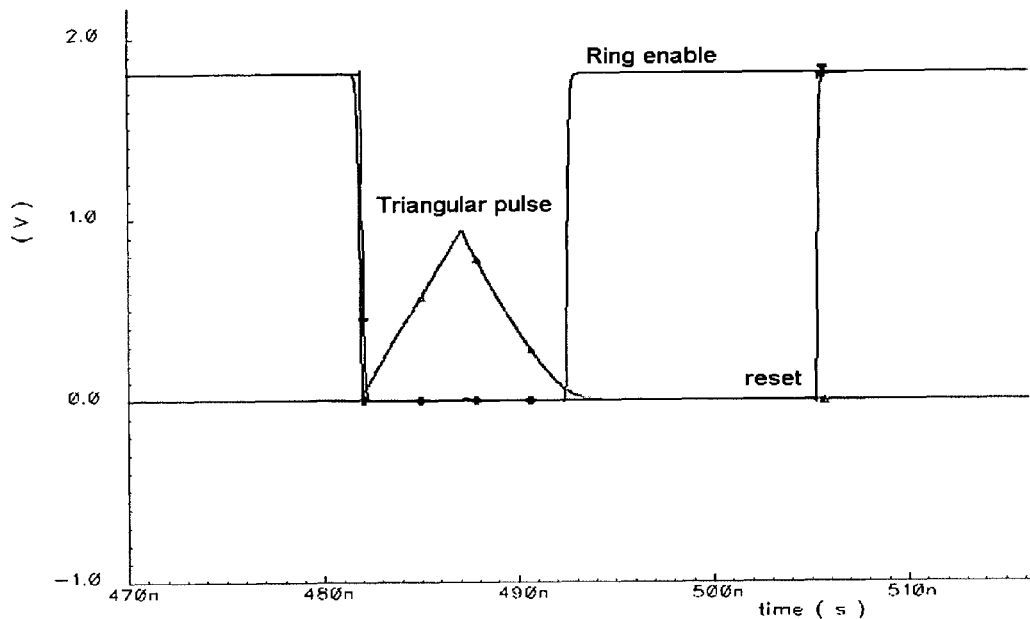
FIG. 9 is a graph depicting simulation results on the ring activation circuit.

The ring activation circuit 306 also uses the timing generation circuit 400. The goal here is to avoid the operation of the ring oscillator when no pulses need to be created. An enabling signal is used and synchronized to the shaping circuit. This starting event is easy to obtain since it is directly the pulse position modulator 302 output. However a stopping event must be created when the triangle duration is over. Since the triangle duration is tunable, using the same capacitor value as for the pulse shaping circuit 304 and a double current value will result in a duration that is equal to the triangle. A NAND operation is used to build the ring enabling signal. FIG. 9 shows the resulting waveforms.

Figure 10:
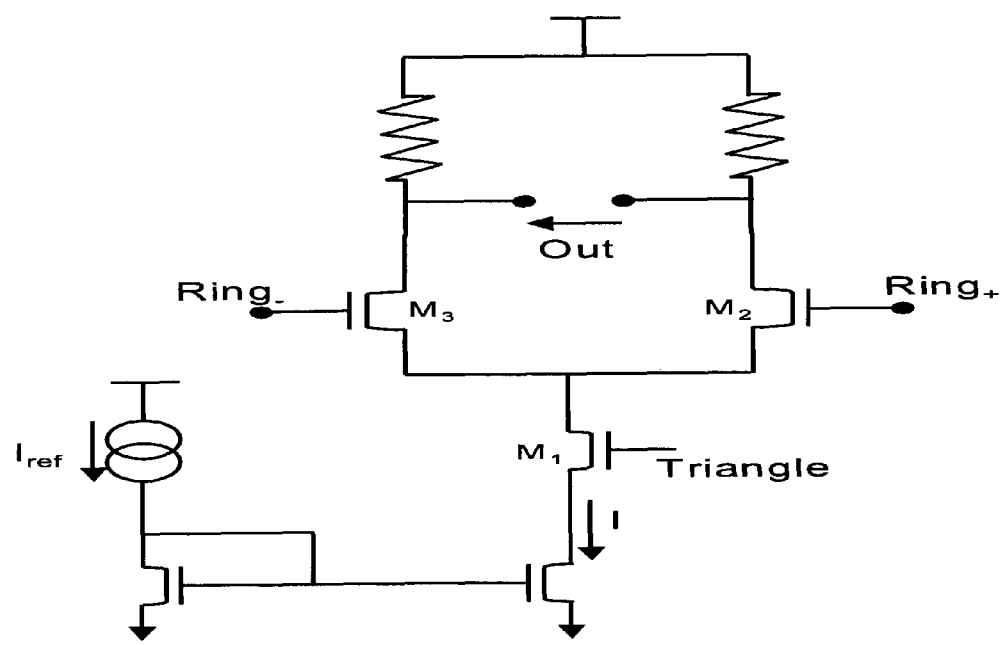
FIG. 10 is a circuit diagram of a mixer circuit, according to an example.

For obtaining the UWB communications signal, the oscillating signal is shaped by the triangle signal, i.e., the two signals are mixed. The circuit used for this operation is shown in FIG. 10. The operation is similar to that of a traditional mixer. The transistor M1 is controlled by the triangular signal. This signal (0→1V) modulates the tail current source following the quadratic law of a MOS transistor in its triode region. The resulting current flows in either branch of the differential pair depending on the ring oscillator differential signal. The resulting voltage at the output is an upconverted quadratic pulse shape. Of course, the single ended voltage at each side of the output contains a strong common mode signal. However, either the differential output can feed directly a differential antenna, or the output can be converted to a single ended signal by means of a balun. In order to reduce power consumption, an output buffer is avoided and the mixer is designed to feed a 50 Ohm load. The different signals are shown in FIG. 11.

Figure 11:
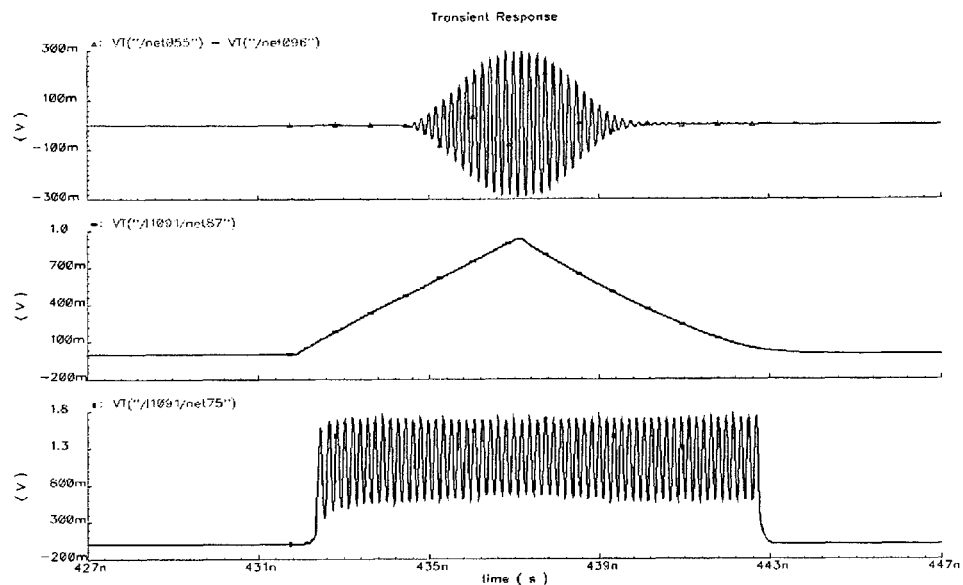
FIG. 11 is a graph depicting simulation results of the operation of the ring oscillator.
Figure 12:
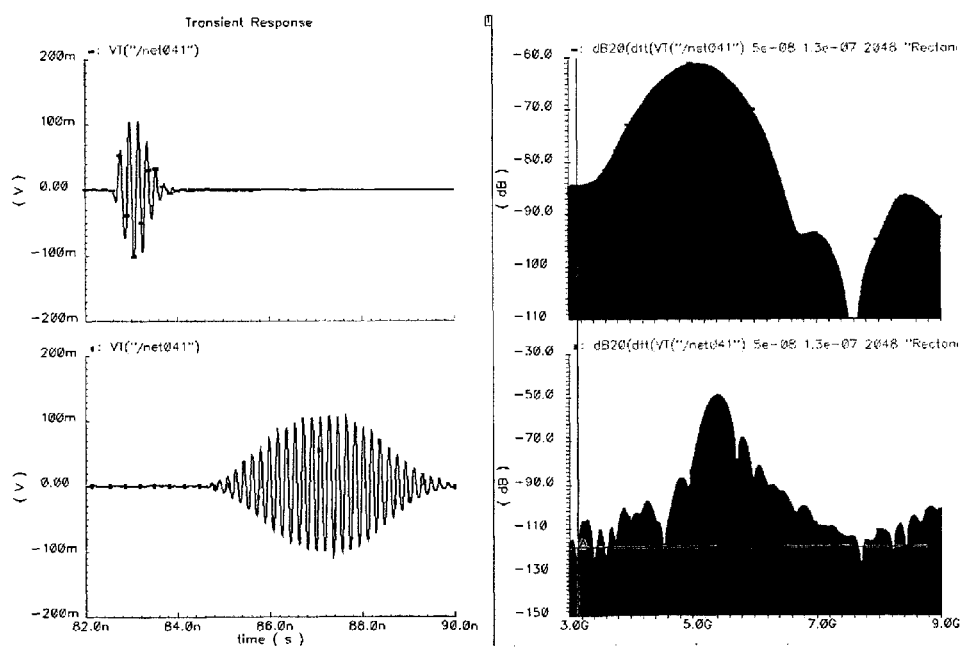
FIG. 12 is a graph depicting tunability of the ring oscillator, according to an example.

As can be seen in FIG. 11, the pulse starts once the triangular waveform reaches the threshold voltage (VT) of the transistor. The tunability of the frequency range is provided by the ring oscillator. The goal to range from 3 GHz to 5 GHz is achieved. The tunability of the bandwidth is from 500 MHz up to 2 GHz. These two extreme cases are shown in FIG. 12. The bandwidth can be tuned to any value between these two extremes.

A maximum output power of −10 dBm is obtained. This output power can be further tuned down to any lower value by either reducing the biasing current of the output buffer or by reducing the triangular peak value. Reducing the output power makes sense if the power consumption of the system is dominated by the output stage. However, in this current version, 90% of the power consumption comes from the ring oscillator. Reducing the output power will help to save only a few percent of the power consumption.

The overall power consumption is 10 mW during active mode and about 100 uW during the sleep mode. The energy necessary to transmit one pulse is 100 pJ for the long pulses (500 MHz) and 40 pJ for the short pulses (2 GHz). The power consumption is divided as follows:

| | | | |
|---|---|---|---|
| Pcons = | 8.5 mW | for the ring oscillator | (85%) |
| Pcons = | 0.5 mW | for the control circuits | (5%) |
| Pcons = | 1 mW | for the mixer | (10%) |

Figure 13:
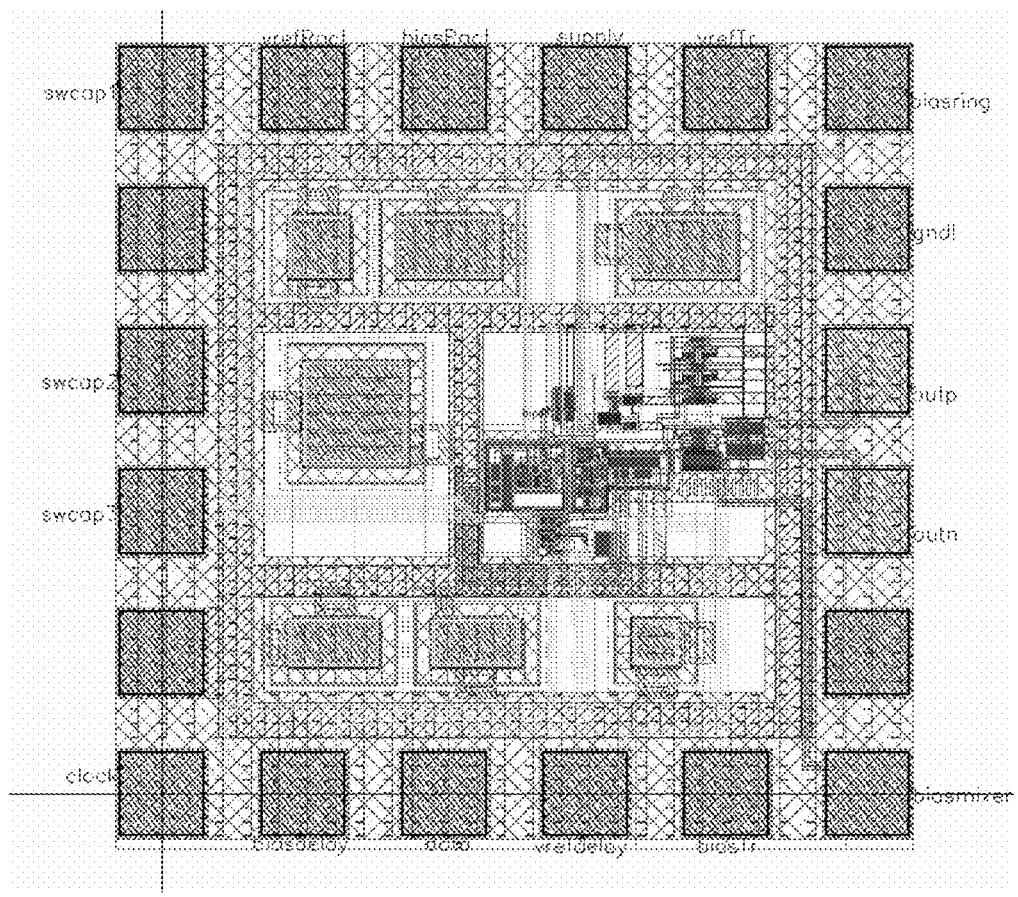
FIG. 13 is a layout of the UWB transmitter depicted in FIG. 3, according to an example.

An example chip layout of the UWB transmitter is shown in FIG. 13.

Figure 14:
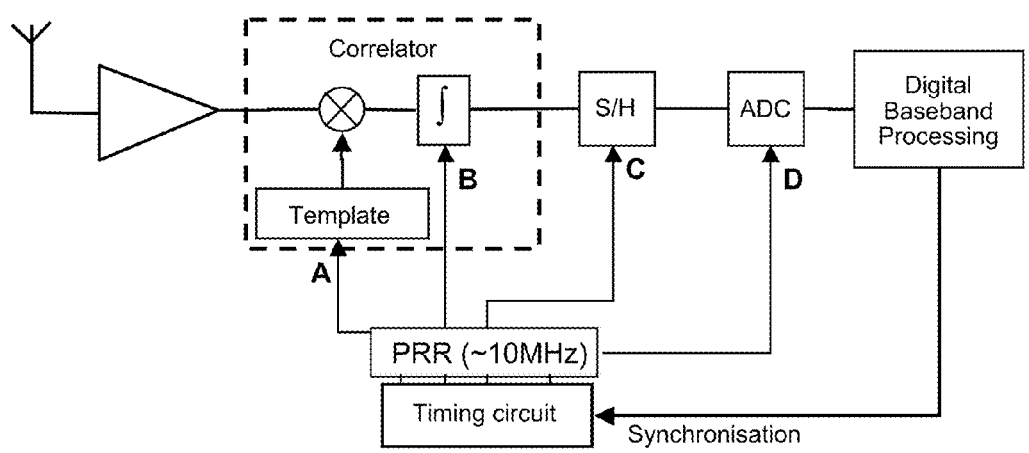
FIG. 14 is a circuit diagram of a UWB receiver, according to an example.

FIG. 14 depicts an example receiver. For the receiver, the basic principle is to shift data processing to the analog domain. The basic principle is then to implement a correlation receiver in the analog domain and convert the result of the correlation to the digital domain to make the decision. The advantage is to allow a low frequency sampling at the ADC.

In this implementation, the accuracy on timings B, C, and D is not too tight since they are processing low frequency signals (ideally, the integrator output is a DC signal). However, this architecture can be viewed as switching the high frequency timing constrains of the ADC into a precise timing for the template generation (signal A). A small drift in the template signal with respect to the received signal degrades the correlation result. For example, assuming a 5th order gaussian as incoming pulse, a drift of 35 ps between the template signal and the received signal is sufficient to produce a wrong correlation value at the output.

Figure 15:
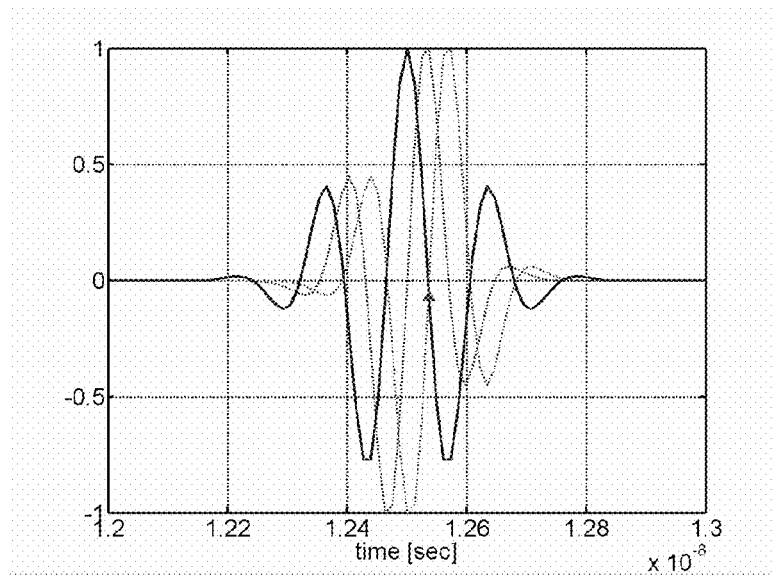
FIG. 15 is a graph depicting drift between received UWB signal and signal template.

This problem with drift is shown in FIG. 15. The first dotted curve is the received UWB signal, the second dotted curve is the template (a time-shifted version of the pulse), and the plain curve is the correlation function. The triangle shows the correlation value for this particular time-shift.

Figure 16:
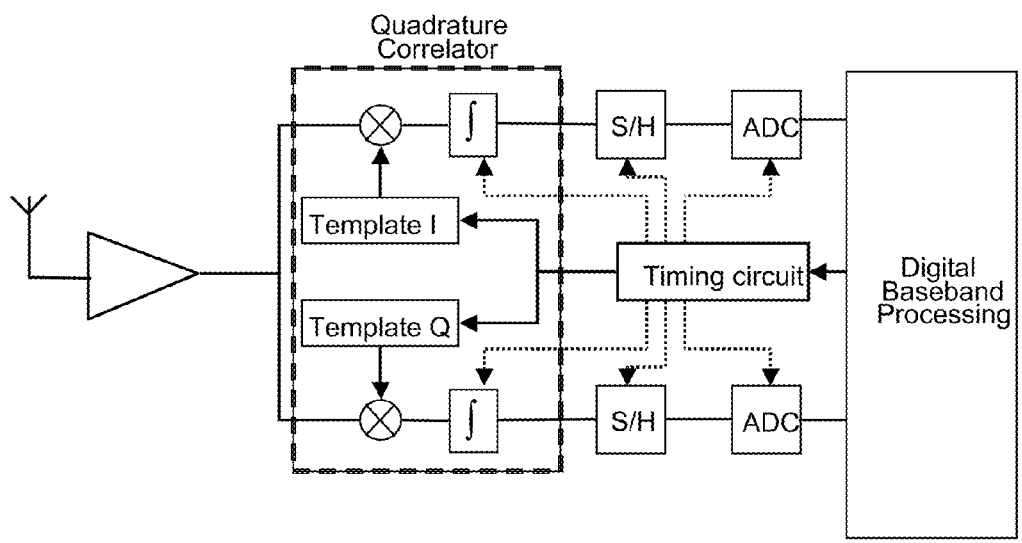
FIG. 16 is a circuit diagram of a UWB quadrature receiver, according to an example.
Figure 17:
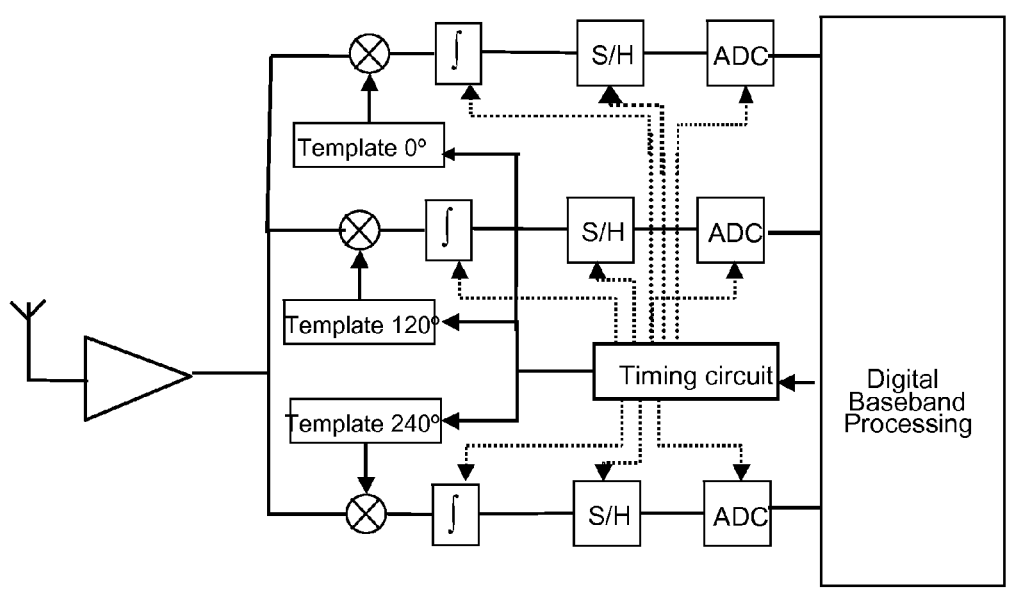
FIG. 17 is a circuit diagram of a UWB receiver with three branches.

To overcome this stringent timing constraint on the template generation timing (signal A), a correlation in quadrature can be used as depicted in FIG. 16. This type of reception technique shows a clear advantage if the received signal features an oscillating carrier. In that particular case, the quadrature signal has the same pulse envelope, but has a carrier in quadrature inside. Different shapes for the envelope can be used to modulate the carrier. However, the shape of the transmitted pulse may define the signal bandwidth. A simple square shape shows too much side-lobe power, whereas a gaussian shape is too complicated to generate with an analog circuit. Therefore, the triangular pulse shape shows interesting advantages both in implementation simplicity and spectrum efficiency. The triangular shape is then preferably chosen as the transmitted pulse.

The optimum receiver should ideally correlate the incoming pulse with its replica, being then the triangular pulse. However, using a square shape as a template in the receiver still shows advantages compared to a triangular pulse:
lower implementation complexity;
correlation error due to a time shift between Tx and Rx clock decreases slower with a rectangle than with a triangular shape;
rectangle will better capture the close distortion of the pulses due to the channel; and
loss of correlation energy with the rectangle is negligible compared to the correlation with a triangle.

In conclusion, the final architecture looks like a traditional direct down-conversion receiver where the local oscillator (LO) is duty cycled to produce pulsed I and Q LO signals. However, a substantial difference with traditional system remains on the use of an analog integration in order to bring a low frequency signal at the ADC input.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

I claim:

1. A method for generating an ultra-wideband communications signal, comprising in combination:
generating at least one piecewise linear pulse having at least two substantially linear parts, wherein at least one of the substantially linear parts is formed by charging at least a first capacitor and a second capacitor and at least the other of the substantially linear parts is formed by discharging at least the first and second capacitors;
generating a piecewise linear ultra-wideband baseband signal having at least one of the piecewise linear pulses, wherein the baseband signal is generated based on an inputted data signal;
generating a carrier tone having a carrier frequency suitable for wireless transmission;
upconverting the baseband signal with the carrier tone to the carrier frequency, thereby generating the ultra-wideband communications signal;
generating a timing signal arranged for timing the charging and the discharging of at least the first and second capacitors, wherein the timing signal is based on the output of a comparator comparing a voltage on the first capacitor and the second capacitor with a reference voltage; and
connecting and disconnecting at least the first capacitor from the comparator using a data signal controlled switch, wherein the second capacitor is parallel to the first capacitor and the switch.

2. The method of claim 1, wherein the at least one pulse has a duration and the carrier tone has a period, and wherein the duration is longer than the period.

3. The method of claim 1, wherein the ultra-wideband baseband signal comprises a plurality of pulses separated from each other in time.

4. The method of claim 1, wherein the ultra-wideband communications signal has a bandwidth of at least one of at least 500 MHz and at least 20% of the carrier frequency.

5. The method of claim 1, wherein the ultra-wideband communications signal has a center frequency within one of a first range of 3-5 GHz and a second range of 6-10 GHz.

6. The method of claim 5, wherein the ultra-wideband communications signal has a bandwidth of maximum 2 GHz if the center frequency is within the first range and maximum 4 GHz if the center frequency is within the second range.

7. The method of claim 1, further comprising tuning at least one of shape and bandwidth of the at least one pulse.

8. The method of claim 1, further comprising tuning the carrier tone frequency.

9. The method of claim 1, wherein generating a carrier tone includes switching an oscillator off between two pulses according to the timing signal.

10. The method of claim 9, wherein the oscillator is a ring oscillator.

11. The method of claim 1, wherein the at least one pulse is a triangular pulse.

12. The method of claim 1, further comprising:
resetting the timing signal by discharging at least the first and second capacitors.

13. The method of claim 1, further comprising:
feeding back the output of the comparator to a switch which is used for discharging at least the first and second capacitors.

14. A method for interpreting a received ultra-wideband communications signal, the signal having a center frequency in a radio frequency domain, comprising in combination:
generating a timing signal by charging at least a first capacitor and a second capacitor parallel to the first capacitor with a current source and comparing a voltage on the first capacitor and the second capacitor with a reference voltage using a comparator, wherein the timing signal is based on the result of the comparison;
connecting and disconnecting at least the first capacitor from the comparator using a data signal controlled switch;
generating a plurality of local signal templates according to the timing signal, wherein the plurality of local signal templates are phase-shifted with respect to each other by approximately 120°, are synchronized with the received ultra-wideband communications signal, and have substantially the same center frequency;
correlating the received ultra-wideband communications signal with each of the local signal templates in an analog domain, thereby obtaining an ultra-wideband baseband signal for each correlation; and
interpreting the ultra-wideband baseband signals to generate a data signal.

15. The method of claim 14, wherein correlating the received ultra-wideband communications signal with each of the local signal templates in an analog domain comprises:
mixing the received ultra-wideband communications signal with each of the local signal templates to obtain mixed signals; and
integrating each of the mixed signals to obtain the ultra-wideband baseband signals.

16. The method of claim 14, wherein generating a plurality of local signal templates includes switching a ring oscillator on and off.

17. The method of claim 14, wherein generating a plurality of local signal templates comprises for each signal template:
generating a piecewise linear ultra-wideband baseband signal comprising at least one pulse, wherein the baseband signal is generated based on the received ultra-wideband communications signal;
generating an upconversion tone having an upconversion frequency substantially equal to the center frequency of the received ultra-wideband communications signal; and
upconverting the baseband signal with the upconversion tone, thereby generating the signal template.

18. The method of claim 14, further comprising:
resetting the timing signal by discharging at least the first and second capacitors.

19. The method of claim 14, further comprising:
feeding back the output of the comparator, wherein the feedback is used for discharging at least the first and second capacitors.

20. A device for generating an ultra-wideband communications signal, comprising in combination:
a signal generator for generating a piecewise linear ultra-wideband baseband signal having at least one pulse, wherein the baseband signal is generated based on an inputted data signal;
wherein the signal generator includes at least a first capacitor, and wherein the signal generator is operative to generate at least one substantially linear part of the pulse by charging at least the first capacitor and to generate at least another substantially linear part of the pulse by discharging at least the first capacitor;
an oscillator for generating a carrier tone having a frequency in the RF domain;
a mixer for upconverting the baseband signal with the carrier tone to the RF domain, thereby generating the ultra-wideband communications signal; and
a timing circuit for generating a timing signal for the signal generator and the oscillator, wherein the timing circuit comprises at least a second capacitor, a current source for supplying current to at least the second capacitor, and a comparator for comparing voltage on at least the second capacitor with a reference voltage, and wherein the comparator provides an output which forms the timing signal.

21. The device of claim 20, wherein the signal generator has a pulse position modulator and a pulse shaping circuit and wherein the pulse shaping circuit is operative to generate at least one substantially linear part of the pulse by charging at least the first capacitor and to generate at least another substantially linear part of the pulse by discharging at least the first capacitor.

22. The device of claim 20, wherein the oscillator is a ring oscillator.

23. The device of claim 20, wherein the timing signal is coupled to at least one of the signal generator and the oscillator for switching off at least one of the signal generator and the oscillator between two pulses.

24. A device according to claim 20 wherein at least the first capacitor is formed by a switch capacitor array.

25. A device according to claim 20, wherein at least the first capacitor includes a first capacitor and a second capacitor, further comprising a data signal controlled switch for connecting/disconnecting the first capacitor from the comparator, and wherein the second capacitor is parallel over the first capacitor and the switch.

26. A device according to claim 20, further comprising a reset node for resetting the timing circuit by discharging at least the second capacitor.

27. A device according claim 20, wherein the output of the comparator is fed back to a switch which is used for discharging at least the first capacitor.

28. A device for interpreting a received ultra-wideband communications signal, the signal having a center frequency in the RF domain, comprising in combination:

a signal generator for generating at least three phase-shifted local signal templates having substantially a same center frequency as the received ultra-wideband communications signal, the local signal templates being phase-shifted by approximately 120°;

a timing circuit for synchronizing the local signal templates with the received ultra-wideband communications signal, wherein the timing circuit includes:

at least a first capacitor and a second capacitor parallel to the first capacitor, a current source for supplying current to at least the first and second capacitors, and a comparator for comparing voltage on at least the first capacitor and the second capacitor with a reference voltage, wherein the device includes a data signal controlled switch operable to connect and disconnect the first capacitor from the comparator, and wherein the comparator provides an output which forms a timing signal;

an analog correlator for each local signal template, wherein the analog correlator correlates the received ultra-wideband communications signal with each local signal template, thereby obtaining an ultra-wideband baseband signal per correlator; and interpretation means for deriving a data signal from the received ultra-wideband baseband signal.

29. The device of claim 28, wherein each of the analog correlators includes a mixer and an analog integrator downstream of the mixer, wherein the received ultra-wideband communications signal and one of the local signal templates provide inputs to the mixer.

30. The device of claim 28, wherein the signal generator has a ring oscillator, and wherein the timing circuit switches the ring oscillator on and off in synchronization with the received ultra-wideband communications signal.

31. The device of claim 28, wherein the device includes three analog correlators.

32. The device of claim 28, wherein the interpretation means includes a baseband detection circuit for detecting pulses in the ultra-wideband baseband signal.

33. The device of claim 28, wherein the timing circuit further includes a reset node for resetting the timing circuit by discharging at least the first capacitor.

34. The device of claim 28, wherein the timing circuit further includes a feedback of the output of the comparator, wherein the feedback is used for discharging at least the first capacitor.

* * * * *